US 12,032,547 B2

(12) United States Patent
Dorrington et al.

(10) Patent No.: US 12,032,547 B2
(45) Date of Patent: *Jul. 9, 2024

(54) AUTOMATED SYSTEM AND METHOD FOR PROCESSING OILFIELD INFORMATION

(71) Applicant: Schlumberger Technology Corporation, Sugar Land, TX (US)

(72) Inventors: Tracy Dorrington, Houston, TX (US); Chiao-Fang Hsu, Katy, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/357,419

(22) Filed: Jul. 24, 2023

(65) Prior Publication Data
US 2023/0367753 A1    Nov. 16, 2023

Related U.S. Application Data

(63) Continuation of application No. 17/595,396, filed as application No. PCT/US2020/033568 on May 19, 2020, now Pat. No. 11,762,825.

(60) Provisional application No. 62/850,017, filed on May 20, 2019.

(51) Int. Cl.
*G06F 16/00* (2019.01)
*G06F 16/22* (2019.01)
*G06F 16/2457* (2019.01)
*G06F 16/28* (2019.01)

(52) U.S. Cl.
CPC .... *G06F 16/2228* (2019.01); *G06F 16/24578* (2019.01); *G06F 16/288* (2019.01)

(58) Field of Classification Search
CPC .......... G06F 16/2228; G06F 16/24578; G06F 16/288; G06F 16/3334; G06F 16/9024
See application file for complete search history.

(56) References Cited

U.S. PATENT DOCUMENTS 9,836,449 B2 * 12/2017 Tong ..................... G06F 40/279
10,430,712 B1 * 10/2019 Reed ...................... G06N 5/046
10,528,871 B1 * 1/2020 Gramatica ............ G06F 16/903
(Continued)

FOREIGN PATENT DOCUMENTS

WO    2019023982 A1    2/2019

OTHER PUBLICATIONS

Extended European Search Report issued in European Patent Application No. 20808795.7 on May 12, 2023; 12 pages.
(Continued)

*Primary Examiner* — Noosha Arjomandi
(74) *Attorney, Agent, or Firm* — Jeffrey D. Frantz

(57) ABSTRACT

Systems, methods, and computer-readable media of which the method includes obtaining a knowledge graph comprising elements and relationships that connect together the elements, receiving a raw oilfield data, generating structured oilfield data based on the raw oilfield data, wherein the structured oilfield data represents information about the raw oilfield data, and generating unstructured oilfield data based on the raw oilfield data, the structured oilfield data, and the knowledge graph. The unstructured data includes data about the raw oilfield data, and one or more of the elements, one or more of the relationships, or both.

20 Claims, 6 Drawing Sheets

(56) References Cited

U.S. PATENT DOCUMENTS

| | | | |
|---|---|---|---|
| 10,628,553 B1* | 4/2020 | Murrish | G16H 70/00 |
| 2008/0228830 A1 | 9/2008 | Hawtin | |
| 2009/0020284 A1* | 1/2009 | Graf | E21B 44/00 |
| | | | 166/250.15 |
| 2009/0194274 A1 | 8/2009 | Del Castillo | |
| 2011/0289074 A1* | 11/2011 | Leban | G06F 16/9038 |
| | | | 707/E17.014 |
| 2012/0046978 A1 | 2/2012 | Cartwright | |
| 2012/0173475 A1* | 7/2012 | Ash | G06F 16/254 |
| | | | 707/E17.058 |
| 2014/0019404 A1* | 1/2014 | Cho | G06N 5/022 |
| | | | 706/59 |
| 2014/0280307 A1* | 9/2014 | Gupta | G06F 16/3331 |
| | | | 707/769 |
| 2018/0018332 A1* | 1/2018 | Diaz | G06F 16/9535 |
| 2019/0042988 A1* | 2/2019 | Brown | G06F 16/9535 |
| 2019/0102430 A1 | 4/2019 | Wang | |
| 2019/0294920 A1* | 9/2019 | Kandaswamy | G06V 10/75 |
| 2019/0392074 A1* | 12/2019 | Little | G06F 16/288 |
| 2020/0117742 A1 | 4/2020 | Huang | G06F 16/24564 |
| 2022/0179882 A1* | 6/2022 | Cervantes | G06N 5/025 |
| 2022/0222230 A1* | 7/2022 | Dorrington | G06F 16/3334 |

OTHER PUBLICATIONS

International Preliminary Report on Patentability of International Patent Application No. PCT/US2020/033568 dated Dec. 2, 2021, 8 pages.

Search Report and Written Opinion of International Patent Application No. PCT/US2020/033568 issued Aug. 28, 2020; 11 pages.

* cited by examiner

Basin Information
Basin ID
Geographic Area
Geographic Perimeter
Subregime
Source

News Stories
Headline 1
Headline 2
Headline 3

Analysis
Sentiment: 0.3
Magnitude: 0.8

Selected Area Information
- Number of 3D Surveys Available
- Number of Fields
- Field Geologic Data
- Hydrocarbon Discovery Breakdown
- Reservoir Information
- Total Number of Wells
- Information Missing
- Company Activity Footprint (Number/Type of wells, Number of Active Companies, Identification of Most Active Companies)

FIG. 5 ated System and Method for Processing Oilfield Information," which is a National Stage of International Application No. PCT/US2020/033568 filed on May 19, 2020 and entitled "Automated System and Method for Processing Oilfield Information," which claims priority to U.S. Provisional Patent Application No. 62/850,017 filed on May 20, 2019 and entitled "Automated System and Method for Processing Oilfield Information," each of which is incorporated herein by reference in its entirety for all purposes.

BACKGROUND

In the oil and gas exploration and production (E&P) field, there are many types and sources of data that can form the basis for different types of analyses, including geological, rock formation types, drilling logs/events, political news, industry/technological development, journal articles, etc. Domain experts constantly evolve their knowledge during their careers via news, journal articles, reports and working with their network of peers. As such, the accuracy and completeness of the analysis currently relies heavily on the expertise and insights of the particular experts involved.

Moreover, finding the relevant information takes time for an individual as data and information is widely-disseminated and cumbersome to discover. For example, fragments of the overall available data for a particular field, entity, etc. may be contained in several different sources, and the full picture may materialize by combining these fragments together. Thus, insight generation and knowledge creation is largely dependent on, and greatly slowed by information gathering.

During the life of an E&P organization, knowledge from experts is neither completely captured nor easily transferred to others. This becomes especially difficult at large scales. Further, over time, the information and knowledge often gets lost and rediscovered several times, yielding inefficiency that may be inherent to such subjective, individualized data collection and organization processes.

SUMMARY

Embodiments of the disclosure provide a method including obtaining a knowledge graph comprising entities and relationships that connect together the entities, receiving a raw oilfield data, and generating structured oilfield data based on the raw oilfield data. The structured oilfield data represents information about the raw oilfield data. The method also includes generating unstructured oilfield data based on the raw oilfield data, the structured oilfield data, and the knowledge graph. The unstructured data includes data about the raw oilfield data, and one or more of the entities, one or more of the relationships, or both.

Embodiments of the disclosure further provide a computing system including one or more processors, and a memory system including one or more non-transitory, computer-readable media storing instructions that, when executed by at least one of the one or more processors, cause the computing system to perform operations. The operations include obtaining a knowledge graph comprising entities and/or events and relationships that connect together the entities and/or events, receiving a raw oilfield data, and generating structured oilfield data based on the raw oilfield data. The structured oilfield data represents information about the raw oilfield data. The operations also include generating unstructured oilfield data based on the raw oilfield data, the structured oilfield data, and the knowledge graph. The unstructured data includes data about the raw oilfield data, and one or more of the entities and/or events, one or more of the relationships, or both.

Embodiments of the disclosure also provide a non-transitory, computer-readable medium storing instructions that, when executed by at least one processor of a computing system, cause the computing system to perform operations. The operations include obtaining a knowledge graph comprising entities and/or events and relationships that connect together the entities and/or events, receiving a raw oilfield data, and generating structured oilfield data based on the raw oilfield data. The structured oilfield data represents information about the raw oilfield data. The operations also include generating unstructured oilfield data based on the raw oilfield data, the structured oilfield data, and the knowledge graph. The unstructured data includes data about the raw oilfield data, and one or more of the entities and/or events, one or more of the relationships, or both.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 5 illustrates a view of a dashboard showing data associated with an entity (e.g., a basin or geographic region), which may be linked together using the knowledge graph of FIG. 3 and using the method of FIG. 2, according to an embodiment.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
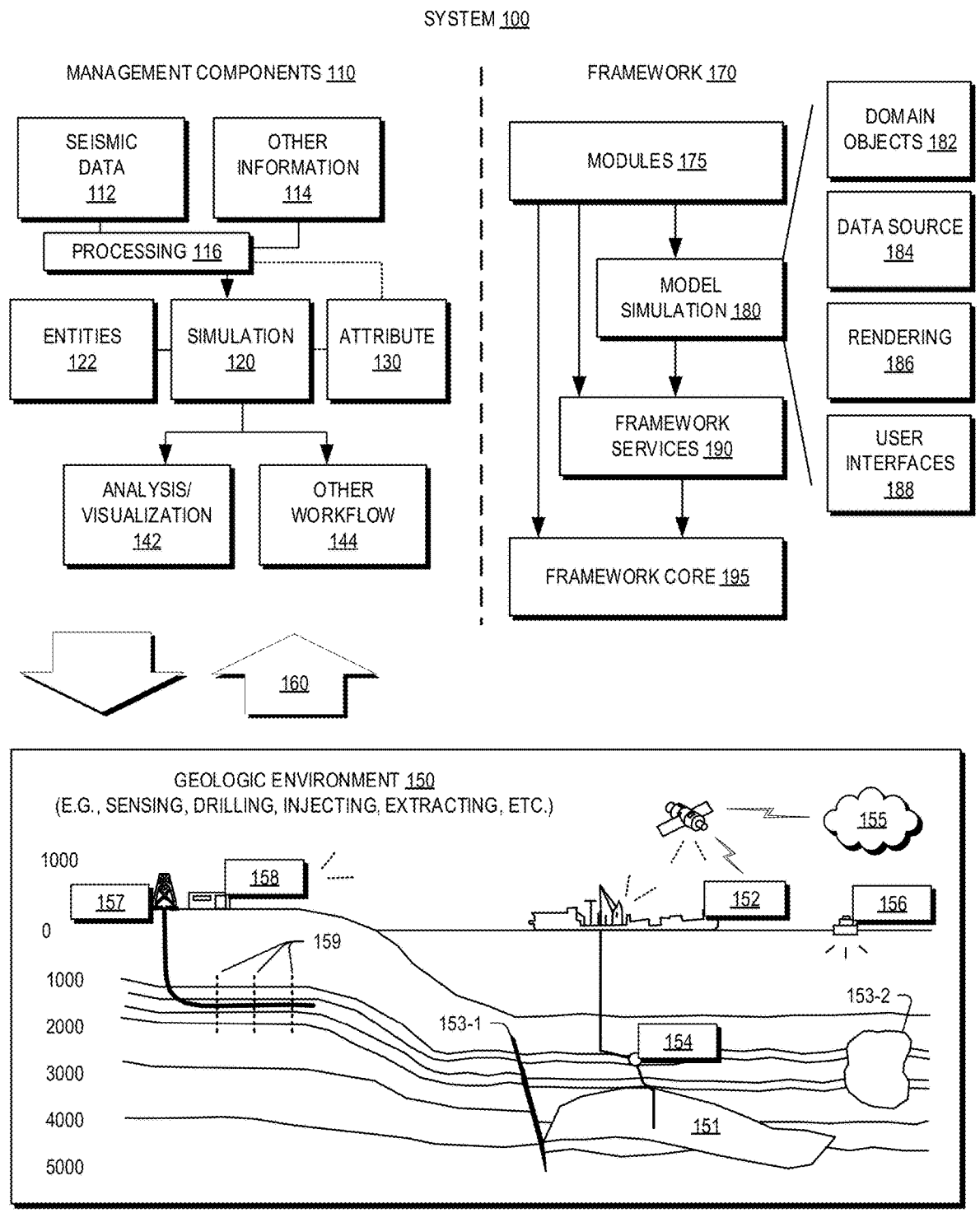
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities and/or events 122. Entities/events 122 may include earth entities or geological objects such as wells, surfaces, bodies, reservoirs, etc. In the system 100, the entities/events 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc. Relatedly, an event of the entities/events block 122 may include any event directly or indirectly related to an oilfield, well production, economics of wells, etc. Such events are described in greater detail below and may be modeled and/or otherwise taken into consideration via the management components 110.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT®.NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Machines have proven abilities in searching, filtering, finding, and retaining information without being encumbered by large data volumes, the scalability of combining and integrating information nor the human limitation of memory endurance. Embodiments of the disclosure may thus provide an Exploration and Production (E&P) "Evergreen Knowledge Mind" that responds to natural language queries by making use of knowledge graphs that connect relevant information from a variety of raw data sources (e.g., news, journal articles and reports), and structures data sources (e.g., E&P companies' databases).

Over time, the collective intelligence of an organization may be grown through KGs where the Mind can find, connect, and store information, facilitating human users rapidly gaining insights and building knowledge about a particular area, event, entity, etc.

Figure 2:
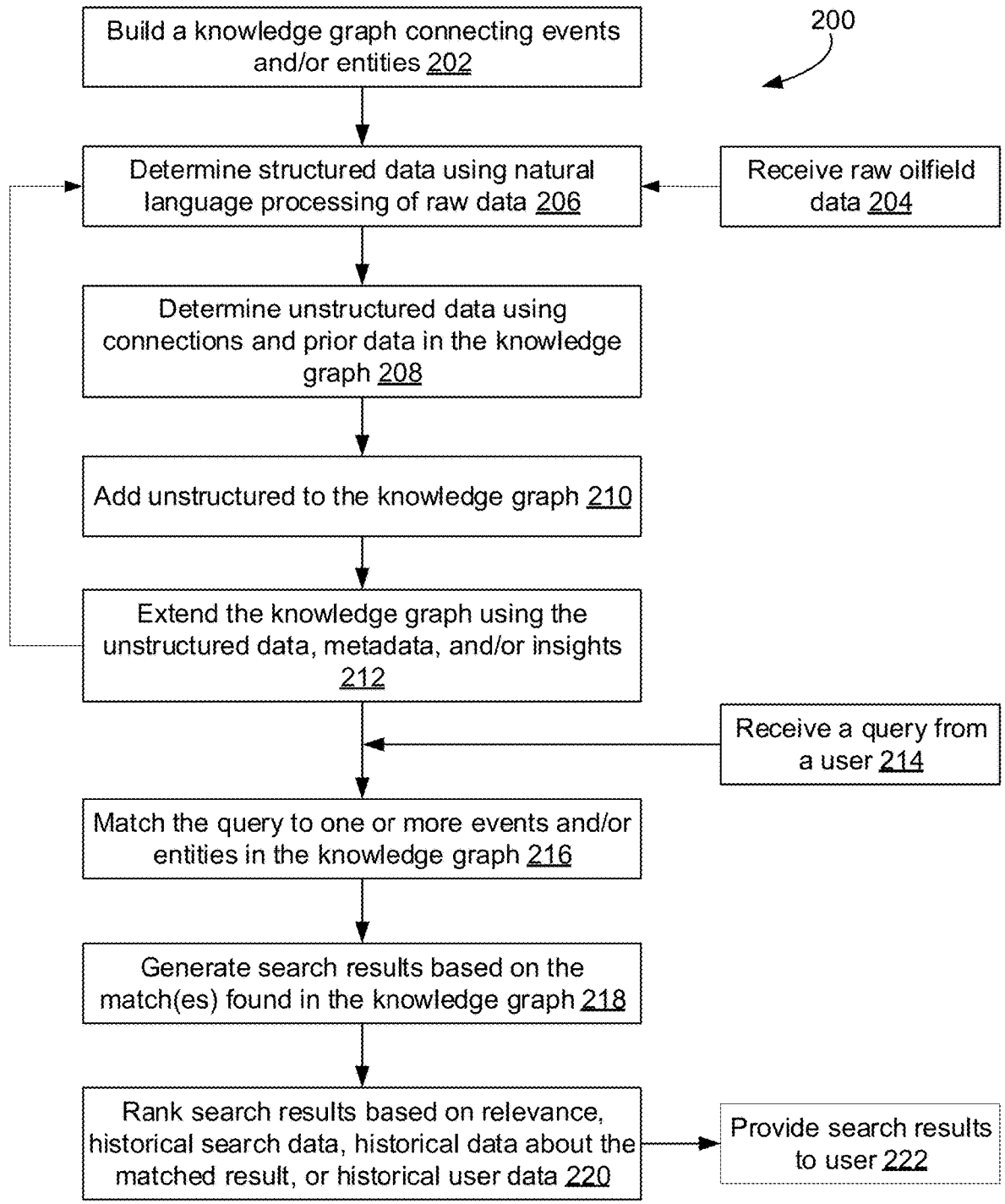
FIG. 2 illustrates a flowchart of a method for collecting oilfield data and determining insights therefrom for use in determining search results in response to a user query, according to an embodiment.

Turning to the illustrated embodiments, FIG. 2 illustrates a flowchart of a method 200 for collecting and organizing data, generating insights therefrom, and providing results to a user, according to an embodiment. The method 200 may begin by building a knowledge graph connecting events and/or entities, as at 202. The knowledge graph may be built using any available data and/or expertise from domain experts, e.g., known facts coming from entities mentioned in different data sources about different data types, such as seismic, well, pipeline, platform, field, prospect, leasing block, basin, play, protraction, gravity, magnetic, bathymetry, and others. The metadata within these sources may provide initial information about how each is related to another. Entities may include various industry participants (well owners, service providers, operators, etc.) and/or government/regulatory entities, or other entities that may impact one or more aspects of the oilfield industry that may be relevant to making determinations about wells. Events may include events directly related to oilfields, such as successful or unsuccessful wells, drilling events, production quotas, etc. Events may also include events that indirectly impact oilfields such as political events (e.g., elections or change of leadership), geopolitical events, events indicating popular sentiment and/or the stability in a region (e.g., protests, riots, etc.), and/or the like.

Figure 3:
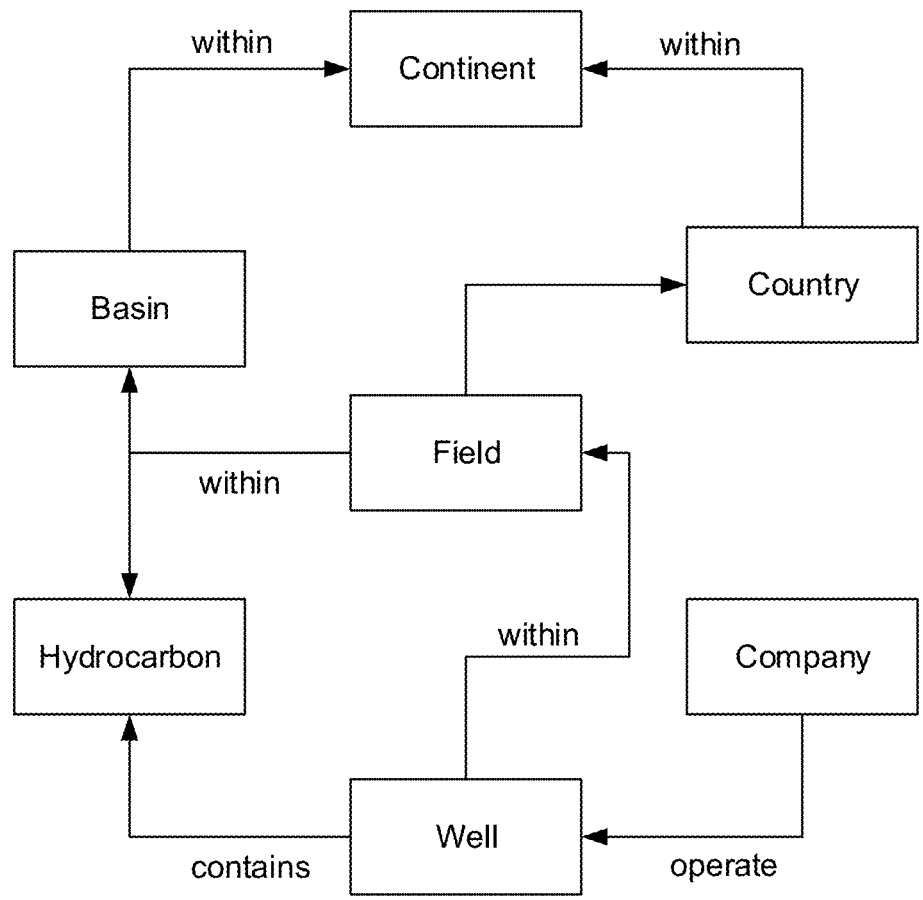
FIG. 3 illustrates a knowledge graph, according to an embodiment.

Thus, the knowledge graph may include various entities and/or events (collectively, "elements" or "nodes"), which are linked together by connections. The connections represent relationships between the various elements. FIG. 3 illustrates an example of such a knowledge graph, according to an embodiment. As shown, the elements are in blocks, and the relationships are indicated by the connections therebetween. The connections may be directional or not (they are directional as shown). Accordingly, for example, in the graph, it is indicated that data about a company (element) may be relevant to a particular well (another element), but not all data about the well may be related to the company operating the well (i.e., as indicated by the directionality of the connection). Further, the well is within a particular field, within a basin, in a field, within a continent, and the graph thus links together these elements are relevant to one another, in at least one direction, based on these relationships. This is but one example among many that the knowledge graph can be used to plot relationships. Thus, the relationships may represent real relationships between elements (e.g., events or entities), e.g., describing how data about one element impacts data about another element.

As noted above, at least some of the elements of the knowledge graph may include or be events, rather than entities, as well. Thus, events may be connected using the knowledge graph, e.g., by reference to what type of entity is directly impacted or otherwise related to the event. For example, an election might impact a country; successful intervention might impact a well; a geopolitical conflict might impact a continent, a basin, or a particular type of hydrocarbon; public sentiment might impact a company or a hydrocarbon, etc. The knowledge graph may provide links between events, e.g., via their associations with the entities, thus indicating how an election might be linked to popular sentiment about an oilfield or a company, thereby providing insights into the impact of different events on one another and/or on the different entities. Moreover, events may, in some embodiments, be a higher-level element in the graph, potentially being associated directly with two or more events, e.g., a country and a basin may be affected directly by an event.

Returning to FIG. 2, the method 200 may include receiving new raw data, as at 204. For example, various industrial organizations may maintain curated (e.g., manually) databases of oilfield information. Lists of oilfields and information related thereto is an example of such structured oilfield data. The raw data may be new articles, journal papers, symposium presentations, logs, etc.

The raw data may generally be text-heavy, and thus the method 200 may include determining structured data (e.g., metadata) using natural language processing of the raw data, as at 206. Natural language processing may use keyword searching/recognition, part-of-speech tagging, etc. to recognize various characteristics of the raw data. The characteristics from the raw data may be loaded into static fields or variables stored in a database, as will be described in greater detail below.

Once the structured data is recognized, the method 200 may proceed to determining unstructured data using connections and prior data in the knowledge graph, as at 208. Unstructured data may be data that does not have a predefined data model (e.g., no static fields with a predetermined set of options). As mentioned above, the knowledge graph may have entities (nodes) that are connected together by relationships (connections). The knowledge graph may thus aggregate or link different pieces of information gleaned from the raw data to the pertinent entity or entities and/or to a particular event. Thus, various small amounts of information may be aggregated and employed to form the basis for larger-scale insights about the various entities and/or events.

Accordingly, the method 200 may include adding the unstructured data to the knowledge graph, as at 210. In some embodiments, the knowledge graph may use the unstructured data to add new entities (nodes) and/or relationships (connections) to the knowledge graph and thereby extend the graph, as at 212, e.g., when new features, companies, etc. become apparent. Similarly, the data collected and generated may be employed to reinforce connections, which may be used to affect rankings in search results, as described below.

The knowledge-graph building process may be iterative. Thus, upon adding structure or unstructured data, the method 200 may loop back to determining more structured data based on additional oilfield data. The knowledge graph may thus be employed to efficiently store the data and to generate insights from the aggregation of the data, rather than merely gleaning data from a single source of raw data.

Figure 4:
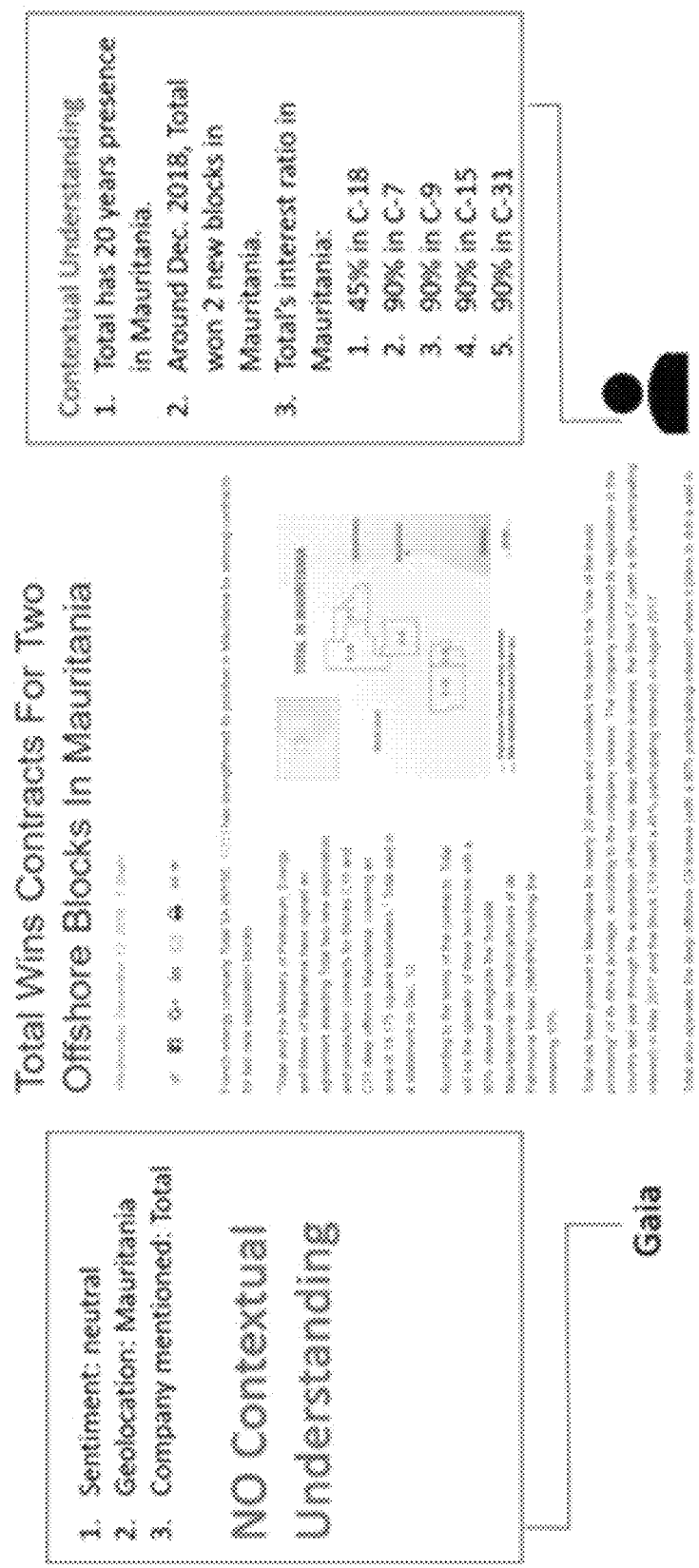
FIG. 4 illustrates an example of raw data, structured data, and unstructured data, according to an embodiment.

To further illustrate the structure, unstructured, and raw data, FIG. 4 illustrates an example thereof. As shown, a news article is provided, which represents the raw data. By processing the raw data itself, metadata (structured data) is gleaned, and predetermined fields for the structured data (in this example, sentiment, geolocation, company mentioned, and/or event type) may be populated. However, the structured data/metadata may generally relate solely to the raw data, and thus may not place the raw data in its proper context in the world of information available. Thus, the knowledge graph may be employed to generate contextual understanding, i.e., unstructured data. The unstructured data may not rely on static fields like the structured data but may provide additional insight to users based on the impact of the raw data.

Returning to FIG. 2, with the knowledge graph built (or at least a stage of iteration thereof complete), the method

200 may receive a search query from a user, as at 214. The search query may be a request related to a location, well, basin, field, company, event, etc., e.g., one of the entities on the knowledge graph and/or an event associated therewith, and thus the query may be matched thereto, as at 216. This may be used to generate search results, as at 218.

Each entity and/or event may be linked to a tremendous amount of information, much of it potentially uninteresting to the user. Thus, the search results may be curated based on a variety of factors before being provided to the user. For example, the search results may be ranked, as at 220. In some embodiments, the search results may be ranked based on historical trends. For example, a particular basin may have a certain frequency of raw data collected that is related thereto; however, when a certain event occurs, the frequency of raw data collected thereto may increase rapidly. The method 200 may recognize the anomalous activity, and determine that it is likely relevant to any searches related to that well, or its basin, the company operating the well, etc. Further, a user's search history and historical search result utilization may be employed to adjust rankings such that those similar to prior interactions (e.g., the present search may be for a different basin than in the past, but the user may often search for a particular type of well, and thus search results in the different basin that are related to the same type of well may be prioritized).

The ranking/prioritization of the search results may employ predictive and prescriptive analytics. Classification, regression, or convolution neural network modeling (or other machine learning) may allow quick prediction on a few key problem domains. Recommendation engine technique can be used to incorporate the user historical data and then suggest areas to focus on in the future. Various ranking algorithms can sort the importance of each piece of relevant information per query and surface the most relevant results. Once the search results are prioritized, the method may provide the search results to the user, as at 222.

Accordingly, the present knowledge tree implementation may allow for an efficient search through a vast amount of data, not only by ranking the data by trends and historical importance (generally or to an individual user), but also by developing relationships between entities and/or events. Thus, the data returned from a query may be curated to collect and summarize data from a wide variety of raw data sources about a particular entity and/or event, and its impact on other entities/events, even when the raw data sources do not directly mention the entity that the user initially searched for. Moreover, the knowledge graph may aggregate raw data, where each bit of raw data provides a piece of the overall picture, and thus provide the overall picture, e.g., in summary or insights, to the user, without necessitating the user reviewing all the raw data.

FIG. 5 illustrates a dashboard 500 of an output of the method 200, e.g., using the knowledge tree of FIG. 3, according to an embodiment. For example, a user may provide an input, which may include selecting a geographical area, entering a name or otherwise selecting a particular basin, or the like. A geographical depiction (e.g., map) of the region may be shown in a first window 502. In another window 504 of the dashboard 500, a simplified view of the map may be shown, e.g., indicating cities, political boundaries, etc. In another window 506, basic basin information may be provided, e.g., an identification (e.g., assigned number, name, etc.) of the basin, a geographic location/area thereof, a geographic perimeter, subregime, and source, may also be provided. Yet another window 508 may indicate unstructured data related to the basin and/or one or more other elements (entities or events) linked to the basin. Such unstructured data may include news stories, as well as an analysis of the news stories (e.g., giving a numerical value to the sentiment toward oil extraction operations in the area, and a magnitude of those sentiments). A window 510 may specify more detailed geological and oil E&P activities in the basin. As indicated, this window 510 may indicate a number of surveys (3D or otherwise) that are available, a number of fields in the basin, field geological data, hydrocarbon discovery breakdown (e.g., depth, layers where hydrocarbon reservoirs were found, etc.), reservoir information, total number of wells, information that is missing for the basin, and historical and current activities by industry participants (e.g., companies) in the area.

This visualization of the curated data, provided by the dashboard 500, generated using knowledge tree of FIG. 3, according to the method 200 of FIG. 2, may facilitate a user making a determination about the merits of oilfield activities in a particular area. This data may be reliably and repeatable recovered using the method 200, such that company-wide, or even industry-wide, data about a basin, or another entity, may be obtained and efficiently employed.

Figure 6:
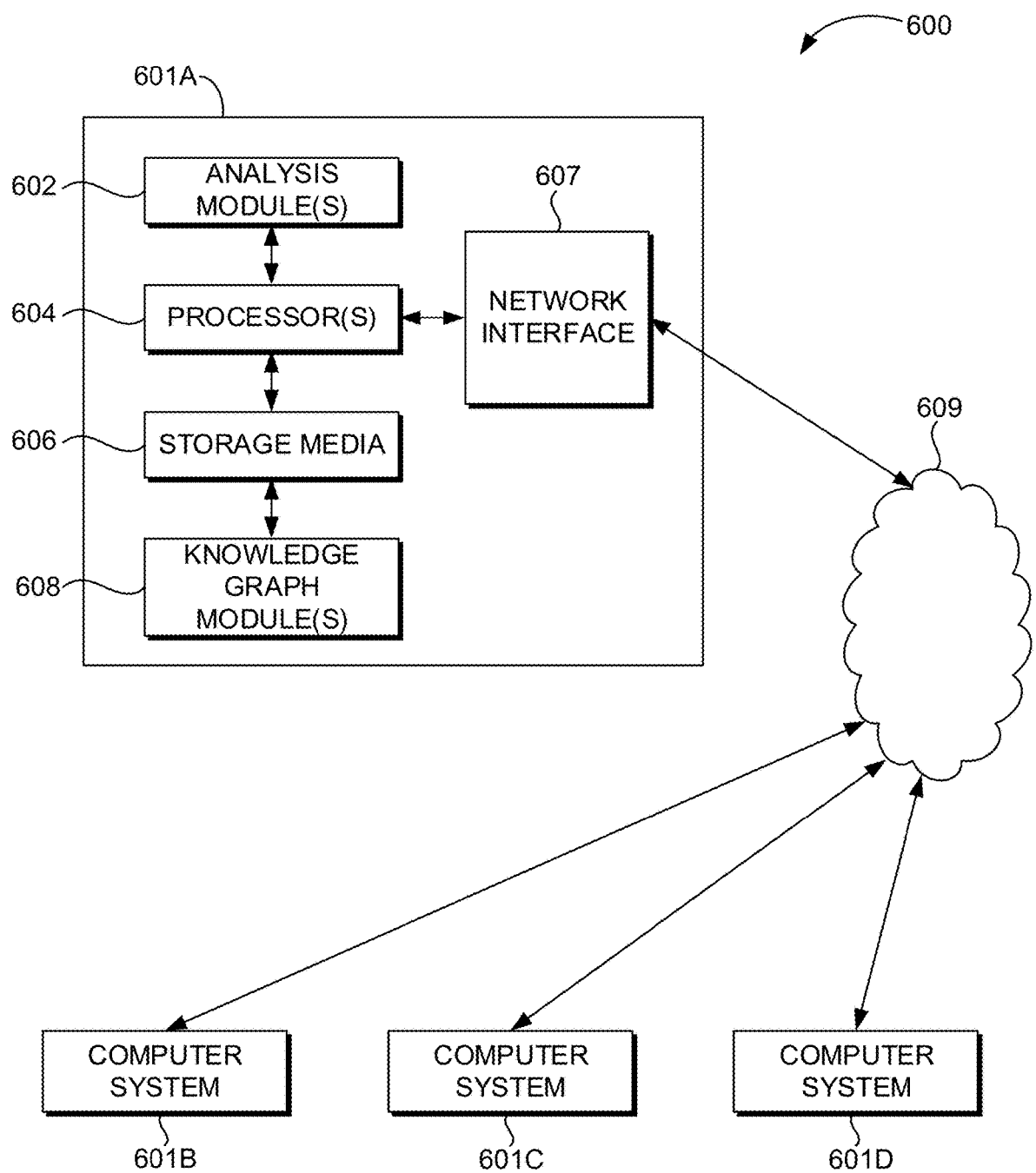
FIG. 6 illustrates a schematic view of a computing system, according to an embodiment.

In some embodiments, the methods of the present disclosure may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis modules 602 that are configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601A to communicate over a data network 609 with one or more additional computer systems and/or computing systems, such as 601B, 601C, and/or 601D (note that computer systems 601B, 601C and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents).

A processor may include a microprocessor, microcontroller, processor module or subsystem, programmable integrated circuit, programmable gate array, or another control or computing device.

The storage media 606 may be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 600 contains one or more knowledge graph module(s) 608. In the example of computing system 600, computer system 601A includes the knowledge graph module 608. In some embodiments, a single knowledge graph module may be used to perform some aspects of one or more embodiments of the methods disclosed herein. In other embodiments, a plurality of knowledge graph modules may be used to perform some aspects of methods herein.

It should be appreciated that computing system 600 is merely one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 600, FIG. 6), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method, comprising:
   receiving, via one or more processors, a knowledge graph comprising one or more entities;
   generating, via the one or more processors, unstructured oilfield data based on raw oilfield data and the knowledge graph, wherein the unstructured oilfield data is associated with the one or more entities of the knowledge graph;
   adding, via the one or more processors, the unstructured oilfield data to the knowledge graph; and
   outputting, via a dashboard, a visualization of the knowledge graph.

2. The method of claim 1, wherein the knowledge graph comprises indications of connections between the entities.

3. The method of claim 2, wherein the indications of the connections are bidirectional.

4. The method of claim 1, further comprising receiving, via the one or more processors, a search query.

5. The method of claim 4, further comprising providing, via the one or more processors, search results based on the search query and the knowledge graph.

6. The method of claim 4, further comprising matching, via the one or more processors, the search query to the one or more entities of the knowledge graph.

7. The method of claim 6, further comprising determining, via the one or more processors, search results for the search query including the unstructured oilfield data associated with the one or more entities.

8. The method of claim 1, wherein the raw oilfield data comprises articles, journal papers, symposium presentations, logs, or any combination thereof.

9. The method of claim 1, wherein the unstructured oilfield data does not comprise a pre-defined data model.

10. The method of claim 1, wherein the unstructured oilfield data does not comprise static fields with predetermined sets of options.

11. A computing system, comprising:
    one or more processors; and
    a memory storing instructions that, when executed by the one or more processors, cause the one or more processors to:
    receive a knowledge graph;
    generate unstructured oilfield data based on raw oilfield data and the knowledge graph, wherein the unstructured oilfield data does not comprise static fields with predetermined sets of options;
    add the unstructured oilfield data to the knowledge graph; and
    output, via a dashboard, a visualization of the knowledge graph.

12. The computing system of claim 11, wherein the instructions further cause the one or more processors to provide ranked search results based on historical relevance of historical user data.

13. The computing system of claim 11, wherein the instructions further cause the one or more processors to extend the knowledge graph based on new raw oilfield data.

14. The computing system of claim 11, wherein the instructions further cause the one or more processors to reinforce relationships or generate new relationships in the knowledge graph based on new raw oilfield data.

15. One or more non-transitory, computer-readable media storing instructions that, when executed by at least one processor, cause the at least one processor to:

receive a knowledge graph;
generate unstructured oilfield data based on raw oilfield data and the knowledge graph, wherein the unstructured oilfield data does not comprise static fields with predetermined sets of options;
add the unstructured oilfield data to the knowledge graph; and
output, via a dashboard, a visualization of.

16. The one or more non-transitory, computer-readable media of claim 15, wherein the instructions further cause the at least one processor to perform natural language processing on the raw oilfield data.

17. The one or more non-transitory, computer-readable media of claim 16, wherein performing the natural language processing on the raw oilfield data generates structured oilfield data.

18. The one or more non-transitory, computer-readable media of claim 17, wherein the structured oilfield data comprises metadata.

19. The one or more non-transitory, computer-readable media of claim 17, wherein the instructions further cause the at least one processor to generate the unstructured oilfield data based on the raw oilfield data, the structured oilfield data, and the knowledge graph.

20. The one or more non-transitory, computer-readable media of claim 15, wherein the instructions further cause the at least one processor to provide ranked search results based on historical relevance of one or more entities of the knowledge graph.

* * * * *